United States Patent
Havice

(10) Patent No.: US 6,298,716 B1
(45) Date of Patent: Oct. 9, 2001

(54) OPEN ENGINE CYLINDER COMPRESSION TESTING DEVICE

(76) Inventor: David M. Havice, 2136 Carmelita, Sierra Vista, AZ (US) 85635

(*) Notice: Subject to any disclaimer, the term of this patent is extended or adjusted under 35 U.S.C. 154(b) by 0 days.

(21) Appl. No.: 09/483,983

(22) Filed: Jan. 18, 2000

(51) Int. Cl.[7] ........................................ G01L 3/26
(52) U.S. Cl. .................................................. 73/116
(58) Field of Search ......................... 73/116, 118.1

(56) References Cited

U.S. PATENT DOCUMENTS

| | | |
|---|---|---|
| 3,975,945 | 8/1976 | Hauk et al. . |
| 4,085,611 | * 4/1978 | Schwartz ............................. 73/115 |
| 4,782,794 | * 11/1988 | Hsu et al. ............................ 123/23 |
| 5,195,365 | 3/1993 | Chujo et al. . |
| 5,569,841 | 10/1996 | Hoban . |
| 5,753,805 | 5/1998 | Maloney . |

* cited by examiner

*Primary Examiner*—Max Noori
*Assistant Examiner*—Maurice Stevens
(74) *Attorney, Agent, or Firm*—Randal D. Homburg

(57) ABSTRACT

This invention is a device for testing the compression of singular cylinders in an open internal combustion engine or an engine having the head disengaged from the engine block. The device is installed above the cylinder with the piston at its lowest point in the cycle and the piston is then rotated to its highest point in the cycle, increasing the pressure within the cylinder. If the pressure diminishes or does not hold to a constant, an indication of poor compression of that cylinder relative to the piston and ring is indicated by such pressure fluctuation or loss.

4 Claims, 3 Drawing Sheets

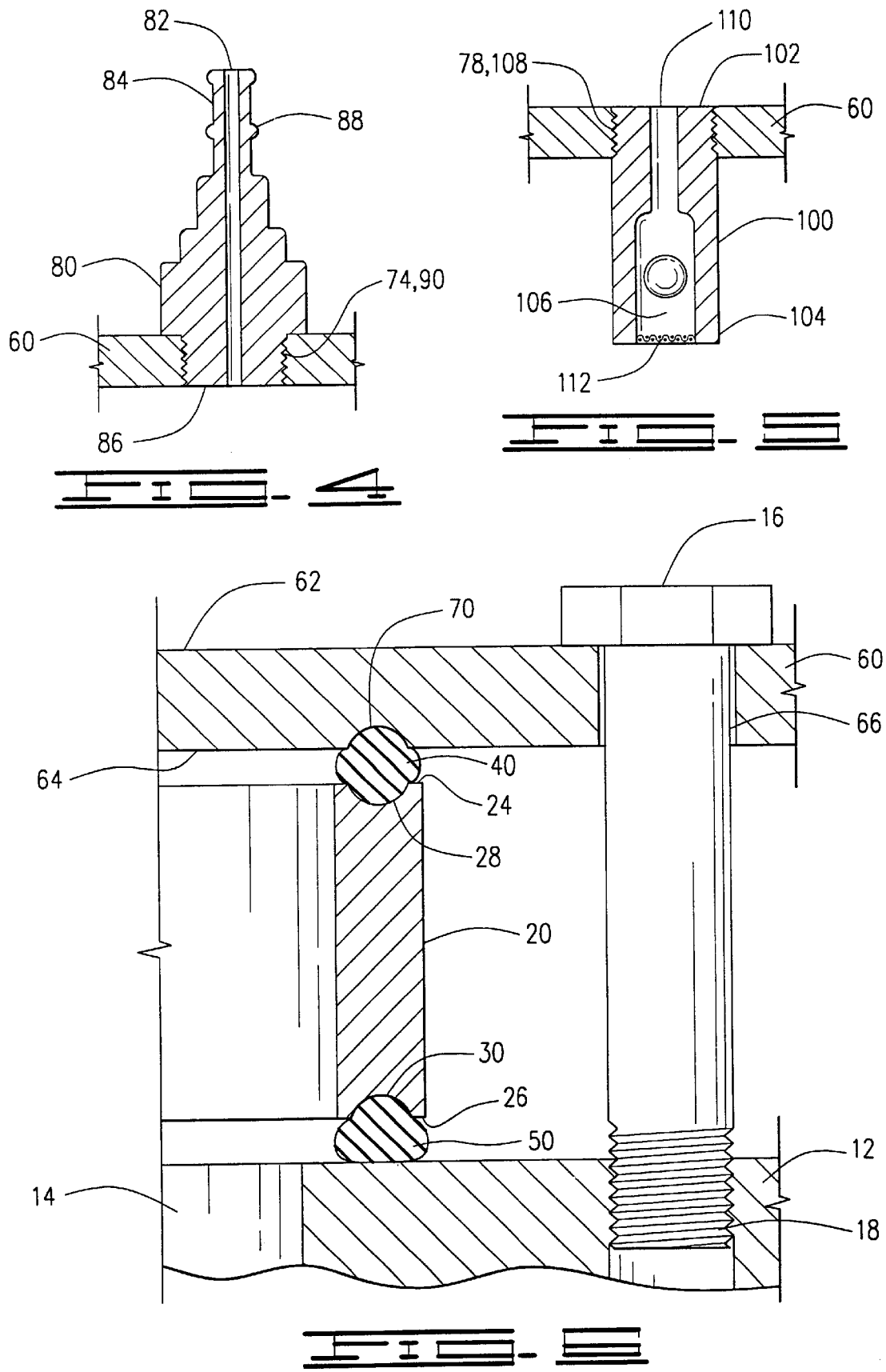

OPEN ENGINE CYLINDER COMPRESSION TESTING DEVICE

CROSS REFERENCE TO RELATED APPLICATIONS

None.

I. BACKGROUND OF INVENTION

1. Field of the Invention

This invention is a device for testing the compression of singular cylinders in an open internal combustion engine or an engine having the head disengaged from the engine block. The device is installed above the cylinder with the piston at its lowest point in the cycle and the piston is then rotated to its highest point in the cycle, increasing the pressure within the cylinder. If the pressure diminishes or does not hold to a constant, an indication of poor compression of that cylinder relative to the piston and ring is indicated by such pressure fluctuation or loss.

2. Description of Prior Art

Several patents identified in prior art address the testing of compression in internal combustion engines by monitoring of electrical control modules, starter motor current, alternator current, battery voltage waveform and other electro-voltaic means. In these cases, the engine must be in an operation state for these devices to conduct their testing.

The following cited U.S. Patents are herein disclosed and incorporated within this utility application by reference. U.S. Pat. No. 4,085,611 to Schwartz, discloses a recording compression testing device connected to the spark plug hole of an engine cylinder by means of a tube wherein the pulse of the engine cylinder is recorded on a continuous roll of paper by a pulse responsive piston connected to an internal recording cartridge. A device for testing leaks from defective piston assemblies in diesel engines is disclosed in U.S. Pat. No. 5,569,841 to Hoban. An electronic modular intake port control device for active monitor and control of an automobile engine is disclosed in U.S. Pat. No. 5,753,805 to Maloney. In U.S. Pat. No. 5,195,365 to Chujo, a combustion pressure sensor arranged within a cylinder head gasket.

II. SUMMARY OF THE INVENTION

The primary objective of this invention is to provide a device for testing the compression of the cylinders of an internal combustion engine while the engine is disassembled and the engine block exposed. The device addresses the issue of proper compression of the cylinder while accessing the components of the engine vital to the compression within the cylinders, namely the pistons, rings and the cylinder bore. The invention is composed of four primary components, including a hollow seal ring, two O-rings and a top seal plate incorporating an air gauge valve and an air check valve.

III. DESCRIPTION OF THE DRAWINGS

The following drawings are informal drawings submitted with this provisional patent application.

FIG. 4 is a drawing of an embodiment of an air gauge valve seated within the top seal plate.

FIG. 5 is a drawing of an embodiment of a check valve seated within the top seal plate.

FIG. 6 is a drawing of the invention in a compressed state.

IV. DESCRIPTION OF THE PREFERRED EMBODIMENT

Figure 1:
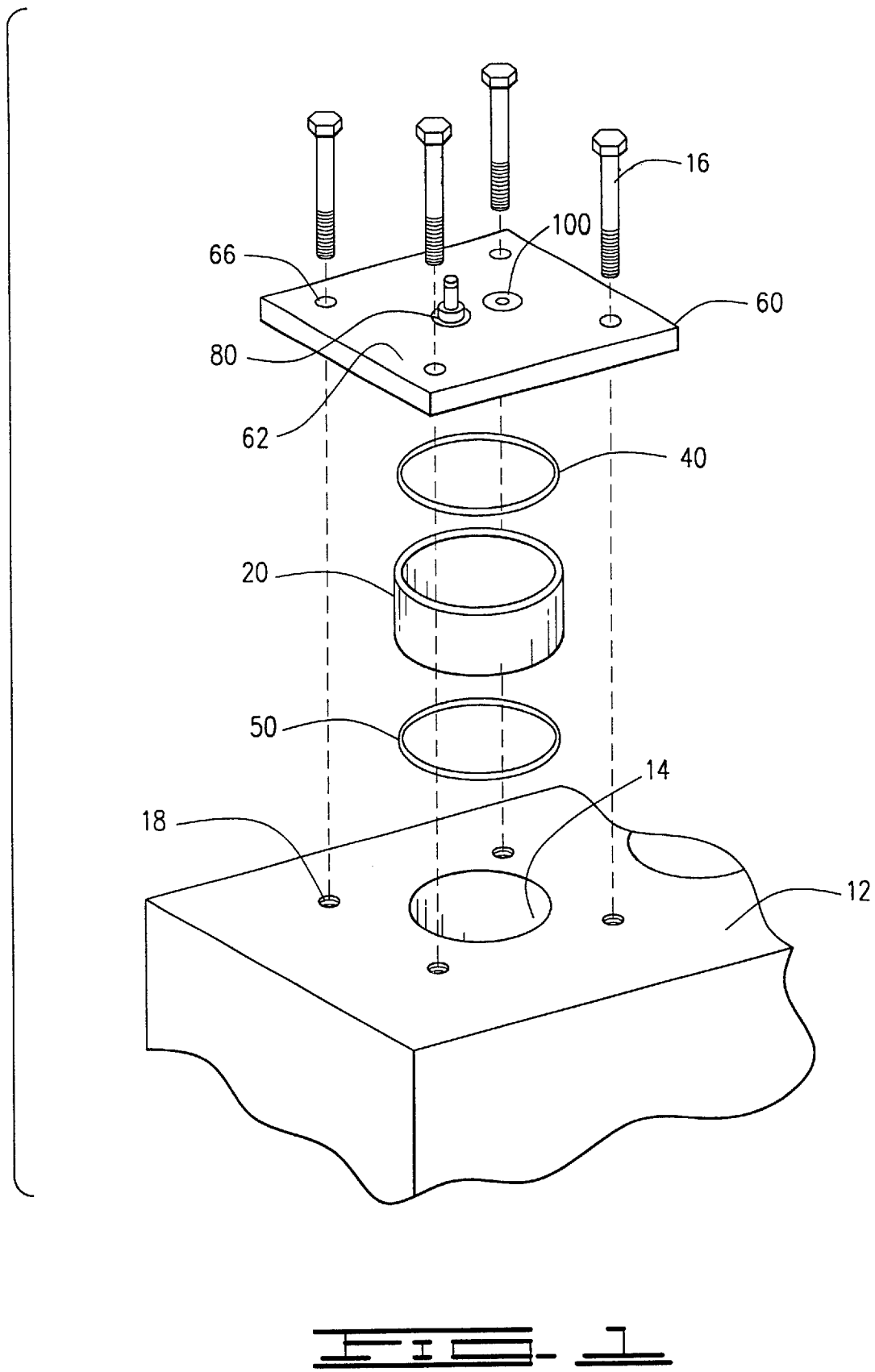
FIG. 1 is a drawing of the invention in expanded view.

The invention 10, as shown in FIGS. 1–6 of the drawings, is a device for testing cylinders 14 on an open internal combustion engine disassembled to the engine block 12 using the engine head bolts 16 and the threaded engine head bolt holes 18 in the engine block 12, comprising a hollow seal ring 20, an upper O-ring 40, a lower O-ring 50 and a top seal plate 60 having an incorporated air gauge valve 80 and an air check valve 100.

Figure 3:
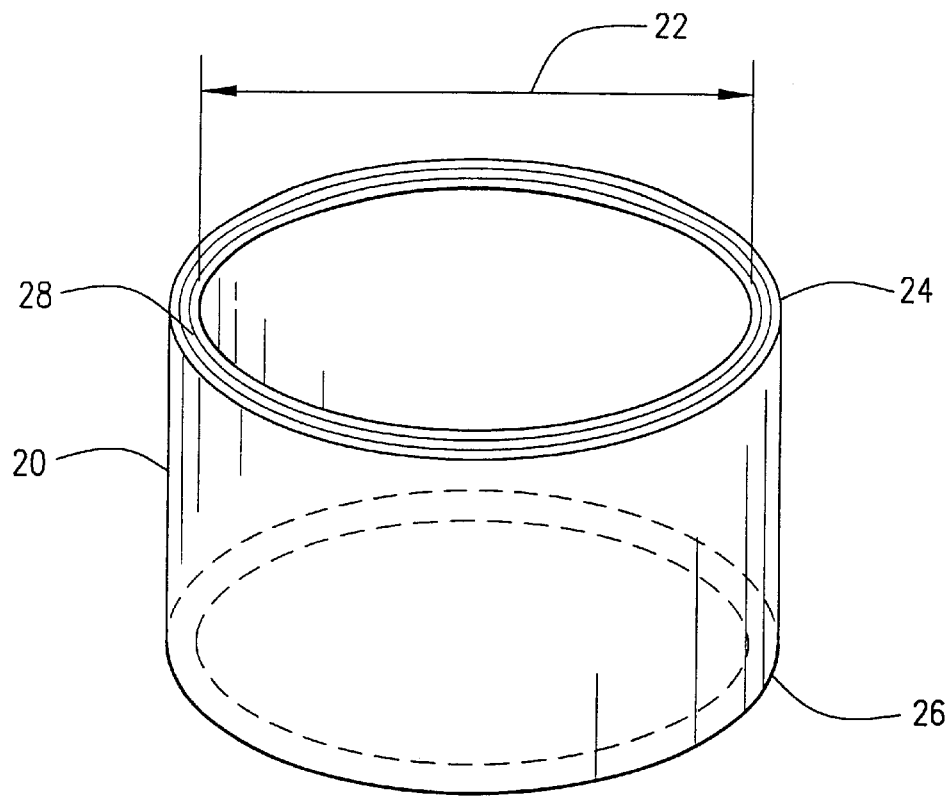
FIG. 3 is a drawing of the hollow seal ring.

The hollow seal ring 20, as shown in FIGS. 1, 3 and 6 of the drawings, is a rigid hollow cylinder made of a material strong enough to withstand the compression pressure of an internal combustion engine without distortion or deformation. The hollow seal ring 20 has an inner diameter 22 slightly greater than an outer diameter of the engine cylinder 14 to be tested. The hollow seal ring 20 has an upper rim 24 and a lower rim 26, the upper rim 24 having an O-ring channel 28 within such upper rim and the lower rim 26 also having an O-ring channel 30 within such lower rim.

The upper O-ring 40 is a circular ring having a diameter 42 conforming to the O-ring channel 28 in the upper rim 24 of the hollow seal ring 20. The O-ring 40 is made of a resilient material capable of creating an airtight seal when compressed. The lower O-ring 50 is also a circular ring having a diameter 52 conforming to the O-ring channel 30 in the lower rim 26 of the hollow seal ring 20, and is made of the same material having the same physical characteristics as the upper O-ring 40.

Figure 2:
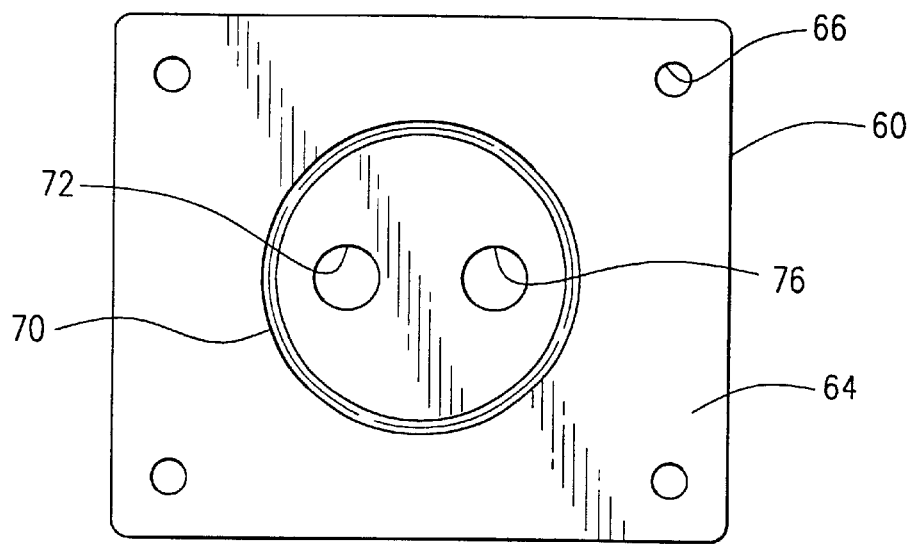
FIG. 2 is a drawing of the bottom surface of the top seal plate.

The top seal plate 60, as shown in FIGS. 1, 2 and 6 of the drawings, is a thin but rigid plate having an upper surface 62 and a lower surface 64, through which four bolt holes 66 are provided, said bolt holes 66 having an inner diameter 68 to tightly accept four engine head bolts 16. Engraved in the lower surface 64 is an O-ring seat 70 accepting the upper O-ring 40. Within the O-ring seat 70, in one embodiment of the invention, is an air gauge socket 72 having an inner thread 74 and a check valve socket 76, also having an inner thread 78.

The air gauge valve 80, as shown in FIG. 4 of the drawings, has a longitudinal bore 82, a first end 84 and a second end 86. On the first end 82 of the air gauge valve is a nipple 88 to receive a standard air chuck 92 or a standard air gauge 94. On the second end 86 of the air gauge valve is an outer thread 90 for threaded insertion within the air gauge socket 72 of the top seal plate 60.

The check valve 100, as shown in FIG. 5 of the drawings, has a one-way airflow means 106, a first end 102 and a second end 104. The first end 102 has an outer thread 108 suited for threaded insertion into the check valve socket 76 of the top seal plate 60, and also has an air inflow port 110 opening into the one-way airflow means 106. The second end 104 has an air outflow port 112, also opening into the one-way airflow means 106.

Assembly and usage of the device begins with a disassembled internal combustion engine having the engine cylinders 14 and the bare engine block 12 exposed. The hollow seal ring 20, having the upper and lower O-rings 40, 50 inserted in the first and second O-ring channels 28, 30 is placed on the engine block 12 encircling the engine cylinder 14 to be tested. The top seal plate 60 is positioned above the hollow seal ring 20 with the O-ring seat 70 directly above the upper O-ring 40. The engine head bolts 16 are place through the four bolt holes 66 of the top seal plate 60 and inserted into the threaded engine head bolt holes 18 on the engine block 12 after which the engine head bolts 16 are tightened down to compress the upper O-ring 40 and the lower O-ring 50. The piston within the engine cylinder 14 to be tested begins at its lowest position. The air gauge valve 80 and the check valve 100 are observed to be snug and secured within the top seal plate 60. The air gauge 94 is placed on the air gauge valve 80 to measure pressure.

In a first test, air is forced into the securely applied device through the check valve 100. The pressure within the cylinder 14 is tested for variance of fluctuation by observing the air gauge 94. In a second test, the piston of the tested cylinder 14 is rotated to the highest position, increasing the compression within the cylinder 14, which is again measured on the air gauge 94. A timed observation of the gauge insures the maintenance of a steady pressure within the cylinder 14. If a steady pressure is not maintained, an indication of a poor compression of that cylinder 14 would lead the person conducting the test to investigate a scored cylinder wall, poorly sealing piston rings or other problems which would affect proper engine cylinder compression.

In another embodiment of the invention 10, the air gauge valve 80 and the check valve 100 are integrated directly into the top seal plate 60.

What is claimed is:

1. A device for testing the compression of engine cylinders in an open internal combustion engine with the engine having the head disengaged from the engine block, comprising:

a hollow seal ring having an inner diameter, an upper rim and a lower rim;

a pressure sealing means on the upper rim and the lower rim;

a top seal plate having an upper surface, a lower surface, four head bolt holes, and a seat to accommodate the upper rim of the hollow seal ring;

the top seal plate having a means to measure air pressure and a means for introducing air through the top seal plate, wherein the lower rim of the hollow seal ring is placed around the engine cylinder upon the engine block, the top seal plate is placed on the upper rim of the hollow seal ring, head bolts from the engine are placed through the four head bolt holes, into the threaded engine head bolt holes in the engine block and the device is compresses forming a sealed assembly, allowing the pressure created within the engine cylinder and the device to be measured by the addition of pressurized air or the movement of the piston with the engine cylinder.

2. The invention as disclosed in claim 1, the pressure sealing means further comprising:

the upper rim of the hollow seal ring has a first O-ring channel;

the lower rim of the hollow seal ring has a second O-ring channel;

an upper O-ring having a diameter corresponding to the first O-ring channel; and a lower O-ring having a diameter corresponding to the second O-ring channel, wherein the lower O-ring is situated between the hollow seal ring and the exposed engine block, the upper O-ring is paced between the hollow seal ring and the top seal plate, such upper O-ring and lower-O-ring slightly deformable to provide a seal withstanding the compression created by the testing procedures.

3. The invention as disclosed in claim 1, the means to measure air pressure further comprising:

an air gauge valve threadably inserted into an inner threaded air gauge valve socket, said air gauge valve socket located within the top seal plate inside the O-ring seat, such air gauge valve having;

a first end having a nipple to receive an air chuck or an air pressure gauge;

a second end having an outer thread to engage the inner thread of the air gauge socket; and a longitudinal bore.

4. The invention as disclosed in claim 1, the means for introducing air through the top seal plate further comprising:

a check valve threadably inserted into an inner threaded check valve socket, said check valve socket located within the top seal plate inside the O-ring seat, such check valve having;

a one-way air flow means;

a first end having an outer thread to engage the inner thread of the check valve socket and an air inflow port connected to the one-way air flow means;

a second end having an air outflow port also connected to the one-way air flow means, wherein pressurized air may be introduced through the top plate into the assembled device for pressure testing.

\* \* \* \* \*